US 6,244,794 B1

(12) United States Patent
Lindsay

(10) Patent No.: US 6,244,794 B1
(45) Date of Patent: Jun. 12, 2001

(54) CLAMP-TYPE DOWELLING JIG

(76) Inventor: James Scullion Lindsay, 814 W. 15th St., Suite 203, North Vanouver (CA), V7P 1M6

(*) Notice: Subject to any disclaimer, the term of this patent is extended or adjusted under 35 U.S.C. 154(b) by 0 days.

(21) Appl. No.: 09/426,317

(22) Filed: Oct. 25, 1999

(30) Foreign Application Priority Data

Sep. 2, 1999 (CA) ................................ 2281372

(51) Int. Cl.[7] ................................ B23B 47/28
(52) U.S. Cl. ............ 408/103; 408/115 R; 408/108
(58) Field of Search .................. 408/103, 108, 408/109, 241 G, 241 B, 115 R, 115 B

(56) References Cited

U.S. PATENT DOCUMENTS

| | | | | |
|---|---|---|---|---|
| 1,161,479 | * | 11/1915 | Kelley | 408/109 |
| 2,260,784 | * | 10/1941 | Morton | 408/103 |
| 2,535,450 | * | 12/1950 | O'Malley | 269/43 |
| 4,952,101 | * | 8/1990 | Coombs | 408/115 R |
| 5,466,098 | * | 11/1995 | Juang | 408/115 R |
| 6,116,826 | * | 9/2000 | Benway | 408/1 R |

* cited by examiner

Primary Examiner—Henry Tsai
(74) Attorney, Agent, or Firm—Frederick Kaufman

(57) ABSTRACT

A clamp-type doweling jig comprising a guide block, to which are attached an alignment fixture at one side, and a clamping feature at the opposite side. In the guide block several bores are aligned and extend through The distance between one end of the guide block and the first of the several holes is equal to the distance between the opposite end of the guide block and the last of the several holes. The above arrangement of the components of this clamp-type doweling jig is adapted, for example, for edge-to-edge, edge-to-end joints. For drilling dowel receiving holes in the face of a wooden workpiece, the clamping fixture is removed from the above arrangement and re-positioned to the alignment fixture. Optionally, the doweling jig is provided with a flip stopper element at each of its ends.

2 Claims, 3 Drawing Sheets

CLAMP-TYPE DOWELLING JIG

BACKGROUND OF THE INVENTION

1) Field of the Invention

This invention relates to doweling jigs in general, and more particularly, to a clamp-type doweling jig for locating in-line holes to be drilled in a wooden workpiece.

2) Description of the Prior Art

Doweling jigs for drilling corresponding holes in mating wooden workpieces, and thereby making possible the matching of these holes for the insertion of dowels and thus, the joining of the wooden workpieces in a desired engagement, are known. The engagements accommodate edge-to-edge, end-to-edge, edge-to-face, end-to-end and mitered joints.

Attempts have been made in the past to develop a better doweling jig. U.S. Pat. No. 5,407,307, dated Apr. 18 1995 and granted to Park for a "Doweling Jig" discloses a device having upper and lower clamping assemblies which move with respect to each other via a thrust screw assembly. Park's device has a number of shortcomings. First, two wooden workpieces are clamped together, one of which has previously been drilled, and in which dowels are installed through alignment slots, provided in the upper clamping assembly. As can be seen, there is a dependency on a previously drilled workpiece. Second, the device is provided, besides drill guides, with alignment slots and with guide slides between the upper and lower clamping assemblies. Thus, the jig described therein appears to be complicated, expensive to make and limited in use, since it has only two drill guides.

U.S. Pat. No. 4,421,442, dated Dec. 20, 1983 and granted to Lindblad for a "Doweling Jig" discloses a device which comprises two clamping jaw and drill guide assemblies, each of these assemblies having a clamping face and a drill guide which is immovable with respect to the clamping face. This device can be considered to have several disadvantages. In making use of the device in drilling corresponding pairs of dowel receiving holes in the two edges of two wooden workpieces, the latter must first be clamped together by a clamping fixture. Then, the doweling jig is clamped to the wooden workpieces, so that the drill guides are juxtaposed to the edges. After each two opposite dowel receiving holes are drilled, the device is unclamped, moved to the next opposite pair of dowel receiving holes and re-clamped.

As can be seen from the above patents, the disclosed devices are not easy to work with, require frequent set-ups and are thus, not quick to use, and also require measurements, due to the limited number of drill guides.

3) SUMMARY OF THE INVENTION

There is accordingly, a need for a doweling jig which overcomes the disadvantages of the prior art. It is further desirable to have a doweling jig provided with a number of holes with an accurately predetermined spacing from one another. Furthermore, to assure a precise coordination between the holes of the joint, use must be made of a common reference plane of the jig for each piece of the joint.

It is a first objective of this invention to provide a well engineered jig, the use of which is more efficient and faster than the doweling jigs known in the prior art or available on the market.

It is another object of the present invention to provide a novel doweling jig, the cost of which is within the practical, economic reach of even a home craftsman.

It is yet another objective of the present invention to provide a jig in which the only adjustment required is basically the adjustment of the distance between the screws which press against the wooden workpiece to be champed, when the jig is in use.

It is a further objective of the present invention to develop a jig which does not separate into numerous parts such as screws, nuts, bolts and other components, which could be easily lost, and difficult to replace, or could be replaced only by the time consuming process of writing to the manufacturer or supplier etc., if indeed they were available at all.

Broadly stated, the clamp-type doweling jig according to this invention, comprises a guide block to which are attached an alignment fixture at one side, and a clamping fixture at the opposite side. The guide block has the form of a parallelepied with top, bottom, lateral, front and back surfaces. In the guide block, several bores are aligned and extend through. The bores are perpendicularly disposed with respect to said top and bottom surfaces. The distance between one end of the guide block, which is delimited by the front surface, and the first of the several bores is equal to the distance between the other end of the guide block, which is delimited by the back surface and the last of the several bores. In each of the several bores, a drill guide is firmly affixed, so that its lower end is substantially flush with the bottom surface of the guide block. On both sides of the guide block, two threaded studs for attaching the alignment and clamping fixtures, respectively, are provided. Each threaded stud has a portion for assembling, with minimal clearance, the above fixtures, and a threaded portion for a knob with a threaded hole.

The alignment fixture incorporates an attachment plate, for fastening, to one of the lateral surfaces of the guide block, and an alignment jaw. The latter extends from the attachment plate downwards and inwards, towards the center of the guide block. Two through holes are provided in the attachment plate, and are so chosen, that the latter is moveable for assembling the alignment fixture with minimal clearance. The alignment jaw incorporates a foot-protrusion which extends partially under the bottom surface, at right angle relative to the attachment plate. The foot-protrusion has an upper face which mates with the bottom surface and runs the length of it, and a reference plane which is parallel to the lateral surfaces and perpendicular to the bottom surface. The clamping fixture includes a joining plate and a clamp plate which forms a single component. The former and latter plates are situated in parallel planes. The joining plate mates with a corresponding lateral surface, while the clamp plate is retracted with respect to the guide block and has two threaded holes, in which screws are inserted for function as clamps.

In one aspect of the invention, the clamping fixture is attached, instead of to the guide block, to the alignment fixture, specifically to the abutting face of it.

In another aspect of the present invention, a removable insert is positioned between the attachment plate and the guide block, or between the attachment plate and the knobs with threaded holes.

Optionally, on both external surfaces of the foot-protrusion, which surfaces are coplanar with the front and back surfaces, respectively, a flip stop element, which can be rotated in either an operative or inoperative position, is provided.

4) BRIEF DESCRIPTION OF THE DRAWINGS

Although the characteristic features of the invention will be particularly pointed out in the claims, the invention itself and the manner in which it may be made and used, may be better understood by referring to the following description of the preferred embodiments, taken in conjunction with the appended drawings in which:

5) DESCRIPTION OF THE PREFERRED EMBODIMENTS

Figure 1:
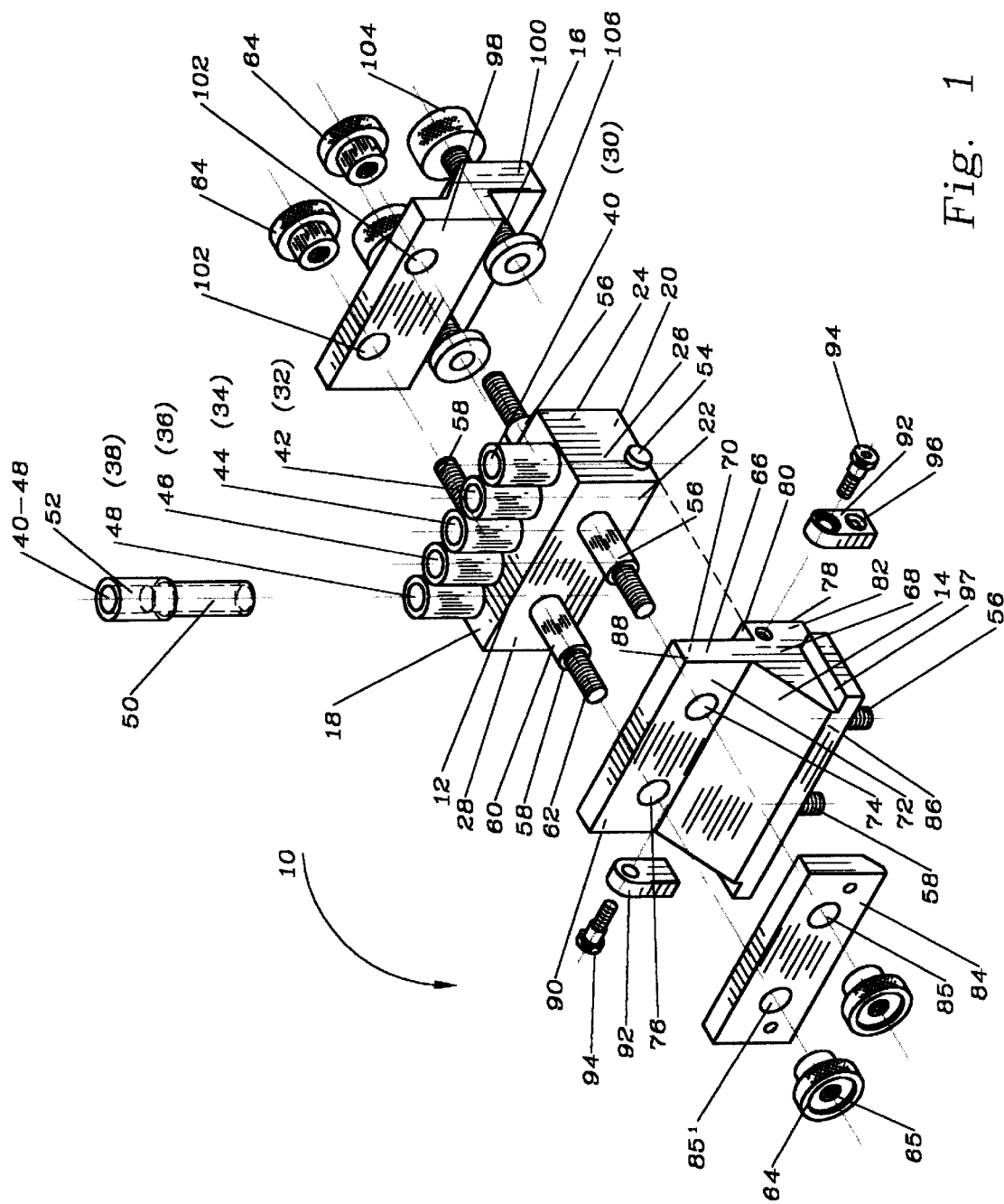
FIG. 1 is a perspective exploded view of the clamp-type doweling jig according to the present invention.

Referring now to FIG. 1, clamp-type doweling jig 10 comprises a guide block 12, to which are attached, at one side, an alignment fixture 14 and, at the opposite side, a clamping fxture 16.

Guide block 12 is preferably made of aluminum and has the form of a parallelepied with top and bottom surfaces 18 and 20, which are rectangular, with lateral surfaces 22 and 24, which are also rectangular, and with front and back surfaces 26 and 28, which are square.

Five evenly spaced bores 30 to 38 are aligned longitudinally in guide block 12, through which they extend, so that their axes are precisely perpendicularly situated with respect to top and bottom surfaces 18 and 20.

The distance between one end of guide block 12, which is delimited by front surface 26 and bore 30, which is proximate to front surface 26, is equal to the distance between the opposite end of guide block 12, which is delimited by back surface 28, and bore 38 which is the closest to back surface 28.

Drill guides 40 to 48, preferably made of steel, are inserted respectively in the five evenly spaced bores 30 to 38 in guide block 12. Each of drill guides 40 to 48 is constituted by a bushing which comprises two sections: a lower section 50 and an upper section 52. The lower section 50 is inserted with an interference fit into the five evenly spaced bores 30 to 38 in guide block 12, so that the lower face of each drill guide 40 to 48 is flush with bottom surface 20 of guide block 12, and the upper section 52 extends from top surface 18 of guide block 12. The interior diameter of lower section 50 corresponds approximately to the diameter of the dowel holes to be drilled in a wooden workpiece, and as is implied, to the diameter of a drill bit mounted in a chuck of an electrically powered drill, to be used for dowel drilling (drill bit, chuck and electrically powered drill are not shown). The exterior diameter of upper section 52 is larger than the exterior diameter of lower section 50, so that a shoulder is formed between the former and the latter named sections. The position of the shoulder is so chosen, that the lower face of each of drill guides 40 to 48 which are inserted respectively in the five evenly spaced bores 30 to 38 in guide block 12, is flush as mentioned previously, with bottom surface 20 of guide block 12. There is, more specifically, between the interior of lower section 50 and the drilling bit, an operational clearance, while between the interior of upper section 52 and the drilling bit there is a relatively larger clearance, to allow the wooden cutting debris to be expelled through the top. The upper end of drill guides 40 to 48 is chamfered on its inner periphery, to form a tapered mouth to facilitate insertion of a close fitting drill bit.

A disc stopper 54 is affixed on front and back surfaces 26 and 28, close to the corner formed by bottom surface 20 and lateral surface 22 which is adjacent to alignment fixture 14.

Two threaded studs 56 and 58 are press-fitted on both sides of guide block 12, from which they extend perpendicularly to lateral surfaces 22 and 24. Two threaded studs 56 and 58 have a cylindrical portion 60 extending from lateral surfaces 22 and 24, followed by a threaded portion 62, the latter having a lesser diameter than the former.

A knurled lock knob 64 is provided with a central threaded hole 65 to fit threaded portion 62 of threaded studs 56 and 58.

Alignment fixture 14 contains an attachment plate 66 which abuts against lateral surface 22 of guide block 12, to which it is joined, and an alignment jaw 68. The latter extends downwards and inwards from attachment plate 66, towards the zone wherein the wooden workpiece to be drilled is located.

Attachment plate 66 has a contact surface 70, which is commensurate and mates with lateral surface 22, and a tightening surface 72, opposite to contact surface 70.

Two through holes 74 and 76 are provided in attachment plate 66. The distance between two through holes 74 and 76, as well as their diameter, are so chosen, that attachment plate 66 is assembled with minimal clearance on cylindrical portion 60 of two threaded studs 56 and 58, which extend from guide block 12 and lateral surface 22, respectively.

Alignment jaw 68 is provided with a foot-protrusion 78. The latter extends at right angles relative to attachment plate 66, under bottom surface 20.

The outline of attachment plate 66, combined with foot-protrusion 78, in its contact zone with guide block 12, represents an L-shaped cutout. Foot-protrusion 78 has an upper face 80, which mates with bottom surface 20 of guide block 12 and runs the length of the latter, and a reference plane 82, parallel to lateral surface 22 and perpendicular to bottom surface 20. In the present embodiment, a distance between the axes of drill guides 40 to 48 and reference plane 82 is chosen to accommodate the requirements for usual joints. This distance indicates where the axes of dowel holes are situated with respect to one of the edges of a wooden workpiece. In order to increase the above distance, a removable insert 84 is intercalated between attachment plate 66 and guide block 12. Removable insert 84 is positioned to obtain a greater distance, as discussed above, between contact surface 70 and lateral surface 22 of guide block 12.

Two holes 85 and 85[1] of the same diameter and spaced longitudinally at the same distance as through holes 74 and 76 are drilled in removable insert 84. Thus, the latter is also movable with minimal clearance on cylindrical portion 60 of two threaded studs 56 and 58.

The knurled lock knobs 64 are used to fasten alignment fixture 14 together with removable insert 84 to guide block 12.

Alignment jaw 68 ends at its lowest part with an abutting face 86 which is perpendicular to attachment plate 66 and parallel to bottom surface 20 of guide block 12. Two threaded studs 56 and 58 are press-fitted, perpendicularly to abutting face 86, into alignment jaw 68. Their size and their longitudinal spacing are the same as for threaded studs 56 and 58 affixed on both sides of guide block 12.

The distance between the axes of threaded studs 56 and 58, which axes extend from guide block 12 and are perpendicular to lateral surface 24 and bottom surface 20, is the same as the distance between the axes of threaded studs 56 and 58, which extend from alignment jaw 68 and are perpendicular to abutting face 86 and reference plane 82.

There are two external surfaces 88 and 90 of alignment fixture 14. External surface 88 is coplaner with front surface 26, external surface 90 being coplaner with back surface 28. A flip stop element 92 is attached to each external surface 88 and 90 by a bolt 94, and is provided with a finger indentation 96 to facilitate its use. Each flip stop element 92 can be rotated from an inoperative position, wherein reference plane 82 allows the wooden workpiece to extend beyond front surface 26 or back surface 28, to an operative position wherein the wooden workpiece is prevented from extending beyond surface 26 or 28. A rib 97 extending from each external surface 88 and 90, limits the movement of flip stop element 92 in its retracted position.

Clamping fixture 16 includes a joining plate 98 continued by a clamp plate 100. The former and latter plates are situated in parallel planes. Joining plate 98 is commensurate and mates with lateral surface 24, while clamp plate 100 is retracted with respect to joining plate 98 and as is implied, to guide block 12. Clamp plate 100 is provided with two threaded holes for use with knurled head screws 104. To each end of knurled head screws 104 a rotateable clamping disc 106 is attached.

Clamping fixture 16 is fastened to guide block 12 by knurled lock knobs 64 used on two threaded studs 56 and 58.

It appears desirable at this point, to describe an arrangement modification 108 (illustrated in FIG. 2) of the just detailed clamp-type doweling jig 10 (see FIG. 1). Arrangement modification 108 is adapted to engage to a wooden workpiece to be drilled into the face, instead of the edge or end. Initially, clamping fixture 16 is removed, together with two knurled lock knobs 64, from its position on guide block 12, and then, repositioned so that its joining plate 98 mates with abutting face 86 of alignment fixture 14; two knurled lock knobs 64 are used to refasten clamping fixture 16 to alignment fixture 14.

Having described in detail the structural components of clamp-type doweling jig 10, in connection with the reference numbers on the accompanying drawings, the basic operation of the jig, forming the present invention, will now be disclosed.

For drilling corresponding dowel receiving holes in each edge of a pair of wooden workpieces which form a joint in a furniture item of conventional design, the following operations are required:

The first wooden workpiece of the above pair is so placed, that its finished surface abuts against reference plane 82, and then, moved laterally, so that its reference end reaches the appropriate end of reference plane 82. Optionally, the adjacent flip stop element 92, can be used. Thus, the fact that the reference end of the first wooden workpiece reaches the end of reference plane 82, is not only visually inspected, but is also physically controlled. At this point in time, knurled-head screws 104 of clamping fixture 16 are tightened and the first drilling operation can take place. Now, in order to locate and then drill dowel receiving holes in the second wooden workpiece, the latter is so positioned that its finished surface abuts against reference plane 82, but its reference end is so located as to reach the opposite end of reference plane 82. In this position, clamping fixture 16 is used to firmly attach and secure the second wooden workpiece. The second drilling operation can now take place. Optionally, an adjacent flip stop element 92, opposite to that used for the first wooden workpiece, can be used.

For an edge to face joint, the dowel receiving holes are made initially in a first wooden workpiece which includes an edge. This first wooden workpiece is brought with the finished surface in contact with reference plane 82. The distance from the latter to the first bore 30 or 38 must be the same as the distance from the reference end of the first wooden workpiece to the first dowel receiving hole.

Figure 2:
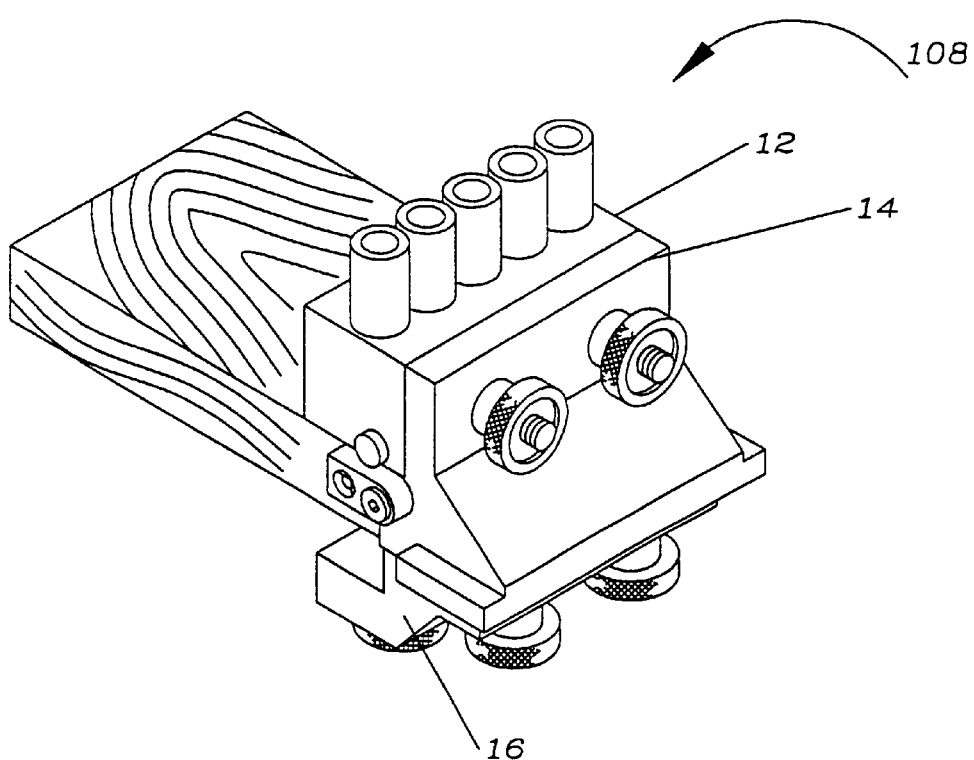
FIG. 2 is a perspective view of the invention when used for drilling a wooden workpiece into the face.
Figure 3:
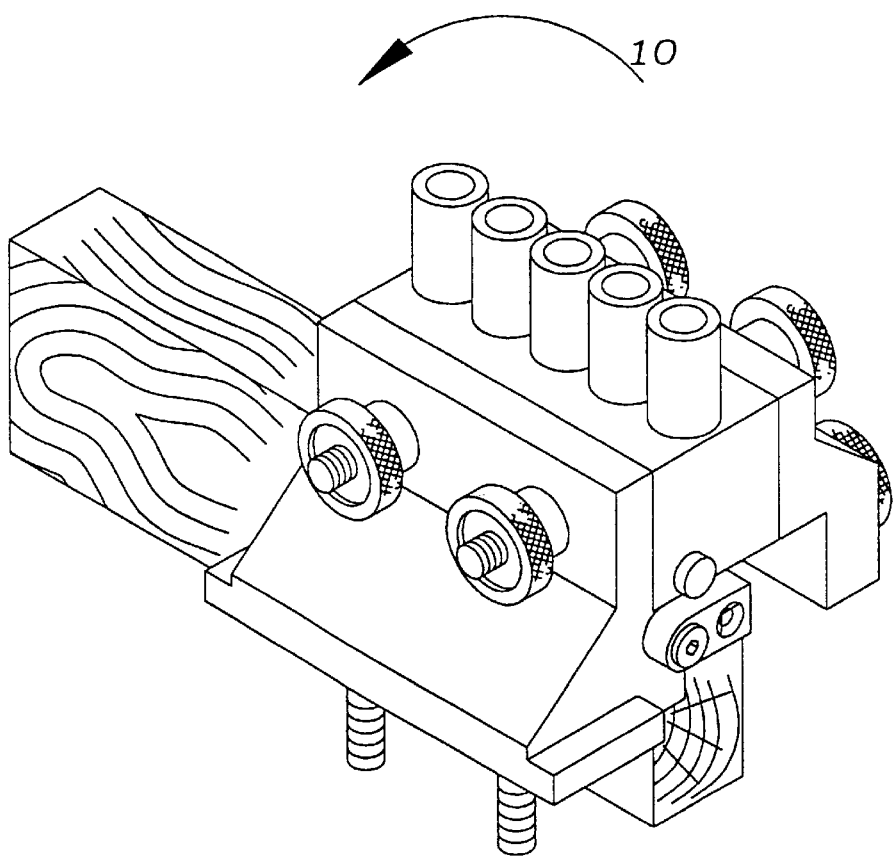
FIG. 3 is a perspective view of the invention when used for drilling the edge or end of a wooden workpiece.

In order to locate and drill dowel receiving holes in the second wooden workpiece which contains the face, clamping fixture 16 is removed from clamp-type doweling jig 10 and repositioned for attachment to alignment fixture 14, specifically to its abutting face 86 (see FIG. 2). The wooden workpiece is so positioned, that its end is brought in contact with reference plane 82, while its surface to be drilled contacts bottom surface 20 of guide block 12. Then, the wooden workpiece is moved laterally, so that its reference end abuts the end of reference plane 82, opposite to that end used for drilling the end in the first piece of the pair. Optionally, a flip stop element 92 can be used when drilling the end and an opposite flip stop 92 for drilling the face.

As required, at least one detailed embodiment to which are added perspective representations, is disclosed above; however, it is to be understood, that the disclosed material is merely exemplary of the invention which may be embodied in various forms. Therefore, specific structural and functional details, disclosed herein, are not to be interpreted as limiting, but merely as a basis for the claims and as a representative basis for teaching one skilled in the art, as to the various uses of the present invention in virtully any appropriately detailed structure.

What is claimed is:

1. A clamp-type doweling jig comprising in combination:
   guide block means;
   alignment means attached to one lateral surface of said guide block means; and
   clamping means attached to an opposite lateral surface of said guide block means;
   said guide block means including a block in a parallelepiped form, with top, bottom, lateral, front and back surfaces, and in said block several evenly spaced bores are aligned and extend through, said bores being perpendicularly disposed with respect to said top and bottom surfaces, and the distance between one end of said block, which is delimited by said front surface, and the first of said several bores, is equal to the distance between another other end of said block, which is delimited by said back surface, and the last of several bores, and in each of said several bores a drill guide is firmly affixed, so that its lower end is flush with said bottom surface, and on both sides of said block, for attaching said alignment means and, respectively, said clamping means, two threaded means are permanently fastened, each threaded means having means for assembling, with minimum clearance, said aligning and clamping means, and a threaded portion to which a knob with a threaded hole is screwed, and said aligning means incorporates an attachment plate for fastening to one of said lateral surfaces of said block and an alignment jaw extending downwards from said attachment plate and inwards towards a center of said block, two through holes provided in said attachment plate are so chosen, that said attachment plate is moveable on said means for assembling, with minimal clearance, said aligning means, said aligning jaw incorporating a foot-protrusion which extends partially under said bottom surface, at right angle relative to said attachment plate, so that an upper face of said foot-protrusion mates with said bottom surface and runs the length of it, and a reference plane of said foot-protrusion is parallel to said lateral surfaces and perpendicular to said bottom surface, and said clamping means comprises a joining plate continued by a clamp plate, said joining and clamp plates being situated in parallel planes, and said joining plate mates with one of said lateral surfaces which is adjacent to it, while said clamp plate is retracted with respect to said joining plate and is provided with two threaded holes in which screws for clamping are inserted.

2. A clamp-type doweling jig, as defined in claim 1, wherein said alignment jaw is provided at its lowest part with an abutting face which is perpendicular to said attachment plate and parallel to said bottom surface of said block, two thread studs being firmly inserted into said alignment jaw, perpendicular to said abutting face, whereby, in another arrangement of said clamp-type doweling jig, said clamping means is adapted to be attached directly to said aligning means.

\* \* \* \* \*